Dec. 17, 1935.         J. L. SUSSMAN                2,024,485
          APPARATUS FOR MANUFACTURING PIPES OR TUBES
              Filed July 9, 1932          2 Sheets-Sheet 1
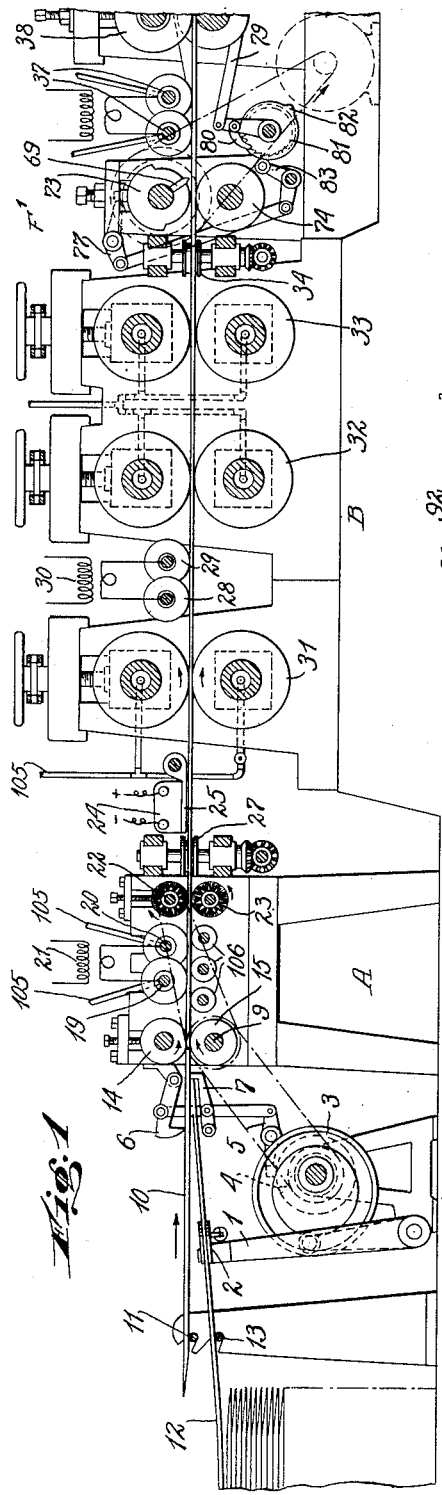
INVENTOR.
BY
ATTORNEYS.

Dec. 17, 1935.     J. L. SUSSMAN     2,024,485
APPARATUS FOR MANUFACTURING PIPES OR TUBES
Filed July 9, 1932     2 Sheets-Sheet 2
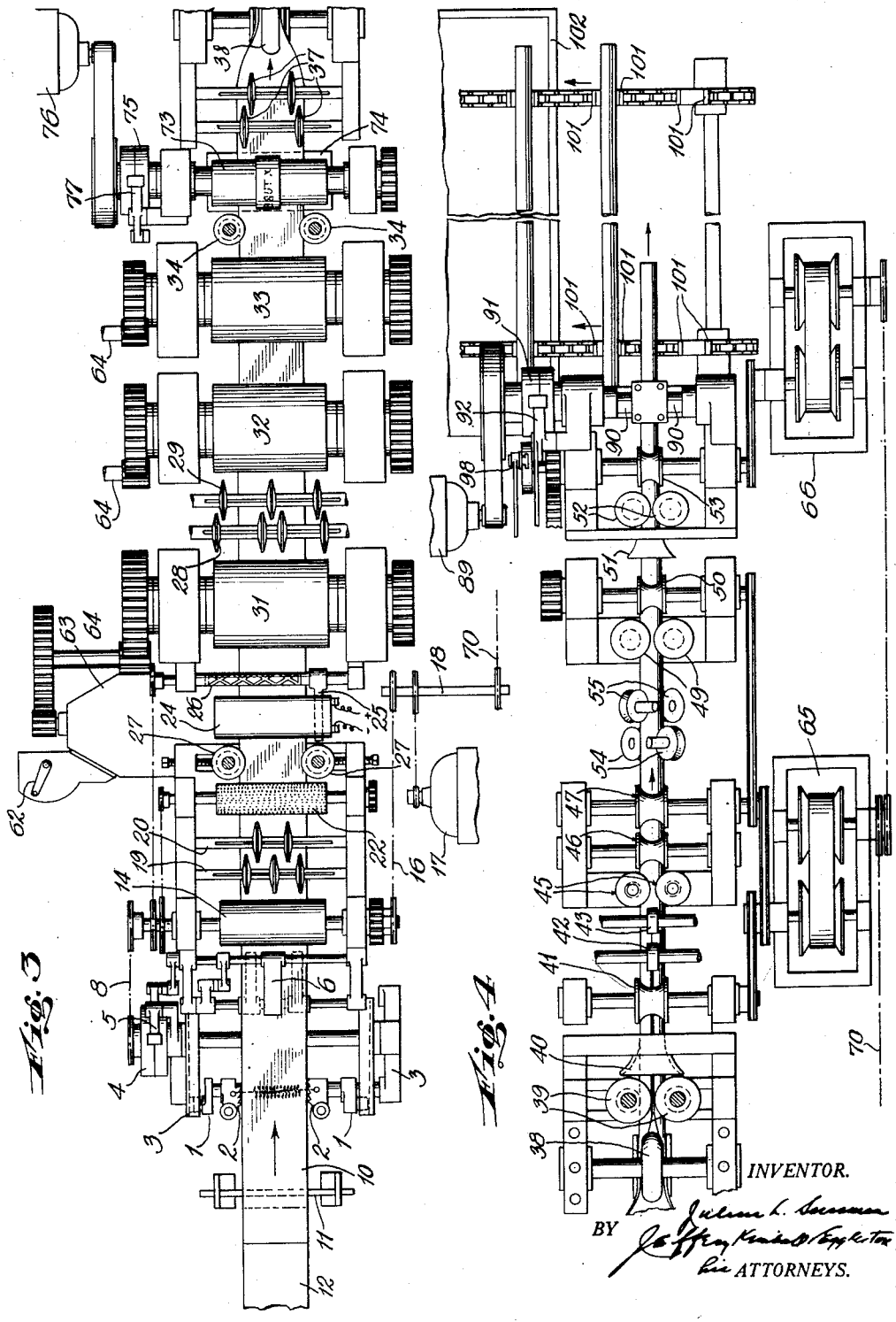

Patented Dec. 17, 1935

2,024,485

UNITED STATES PATENT OFFICE 2,024,485

APPARATUS FOR MANUFACTURING PIPES OR TUBES

Julius L. Sussman, Great Neck, N. Y.

Application July 9, 1932, Serial No. 621,543

11 Claims. (Cl. 29—33)

Consumers of pipe and tubing require pipe and tubing in a large number of diameters, lengths, gauges (thickness of wall), shapes, finishes and tempers. Furthermore the consuming industry requires rather prompt deliveries. To meet these demands of the industry, two methods of manufacture and handling have been developed.

On the one hand, the pipe or tubing is manufactured at the steel mills, usually from heavy billets or skelp and utilizing furnaces to provide the heat needed, and thence the finished product is distributed through dealers and warehouses located in the various centers of the consuming industry. In order that prompt deliveries may be made of any of the various lengths, diameters, shapes, gauges, finishes and tempers that may be called for, this method of supplying the trade requires that large stocks of the finished product be maintained in the local warehouses. A considerable amount of capital is tied up in these large inventories, and this materially increases the cost of the pipe and tubing to the consumer. Furthermore, unusual shapes can be furnished only by a special order to the steel mill and special manufacture of the order at the mill, all of which entails delay in making delivery and a price materially higher than for standard sizes unless the order be a large one.

According to the second method of supplying the trade, the tubing is made locally, adjacent the centers of the tube consuming industry, being rolled up and electrically welded from flat stock or skelp more or less as called for by the consumers. This method of carrying on the trade materially reduces the amount of finished product that must be maintained on hand. However, in order that the manufacturer may be ready to fill promptly an order for tubing of any standard gauge, diameter, finish, etc., that may be demanded, this method requires that each tube manufacturer carry on hand a large stock of skelp of the various gauges, widths, finishes, etc.; furthermore the electric welders now commonly employed are capable of handling only a finished skelp, i. e. skelp fully finished at the steel mill to the proper thicknesses, with carefully finished edges, etc., and to manufacture some of these skelps, for example cold rolled steel skelp of the thinner gauges, is a costly operation. These limitations on this second method of carrying on the business add materially to the cost. Furthermore, again, any tubing requiring an unusual shape of skelp can be furnished through this method only by a special order to the steel mill for the skelp and a special rolling of the skelp at the mill.

In brief then, under both these prior methods of carrying on the business the cost to the consumer of pipe and tubing of standard sizes, finishes, etc., is considerably higher than the cost of the labor plus the cost of the metal in an early heavy-gauge-skelp state, and special tubing can be furnished only after considerable delay and at a still higher price.

By my invention, still a third method of supplying the demands for pipe or tubing is made possible, and one which is not subject to the faults above enumerated.

According to my invention, the pipe or tubing may be manufactured locally, adjacent the centers of the tube-consuming industry, so that the need of maintaining large inventories of the finished product is eliminated, and at the same time all the demands of the consumers for different lengths, diameters, gauges, shapes, finishes and tempers can be met from a stock of strip material including but a very few different widths and gauges; by "strip material" or "strip stock" I refer to a greatly elongated body or article, i. e. having a length a great many times greater than its thickness, as in the case of wire and bars, and including skelp, so called, which is a relatively thin and relatively narrow stock suited to being formed up into tube form and welded to produce tubing or pipe for example; furthermore, the strip stock need be in only a rough or semi-finished condition, i. e. heavy-gauge not carefully finished as to their edges or otherwise; even seconds, or for example skelp non-uniform in width or gauge, and skelp objectionable for ordinary processes and ordinarily rejected, may be employed; also hot rolled skelp. Accordingly the raw material inventory of the pipe or tube manufacturer may be reduced to only a fraction of the inventory of a tubing manufacturer operating in accordance with the second business method outlined above, and a much cheaper raw material may be used. Furthermore, according to my invention, the skelp received from the mills in rolls or sheets may be joined end to end during the manufacture of the pipe or tubing, so that the process of manufacture is a continuous one; and still further, the joining of the skelps can be of such a nature that pieces containing these joints are useable, at least in numerous instances, whereby I eliminate the waste that usually occurs at the end of each piece of skelp. Still further, since the cross-section of the skelp can be modified during the process of manufacture of the pipe or tubing, special non-standard pipe or tubing can be made locally on demand. The joint result is that without delaying deliveries the cost of the pipe or tubing, both standard and special, is brought down to a cost more nearly approximating the cost of the labor and the raw metal.

Hereinafter I use the words "pipe" and "tube" and the like interchangeably.

The nature of a machine embodying my invention can be best explained by reference to the accompanying drawings wherein a machine embodying my invention is illustrated diagrammatically. Fig. 1 is an elevation of the end of the machine at which the raw skelp enters, and Fig. 2 is an elevation of the exit end of the same machine whereat the finished pipe or tube is delivered, certain parts of the machine being repeated in the two figures in order that the relation of the two figures, one to the other, may be quickly seen. Fig. 3 is a plan view of the subject matter of Fig. 1, and Fig. 4 is a plan view of the major part of the subject matter of Fig. 2. Fig. 5 is a cross-section of a special type of tube which the foregoing machine is capable of making. Fig. 6 is a cross-section of the skelp thereof just prior to the forming of the skelp into tubular form.

It will be understood that the drawings are substantially diagrammatic, and that only sufficient of a machine has been illustrated to illustrate the principles and subject of my invention.

Primarily, the machine or assembly of my invention has a device or attachment A, adjacent its entrance, for electrically heating the skelp, or heating such parts of the skelp as may be necessary in any particular instance, whereby the skelp is more or less softened for ready working and manipulation; a hot rolling mill at B for modifying or re-forming the hot skelp into skelp of other dimensions suited to the needs of the pipe or tubing in the process of manufacture at the moment, this mill at least being capable of reducing the thickness of the skelp to the gauge, or something like the gauge, desired in finished pipe or tubing, and preferably also being capable of modifying the thickness of the skelp from point to point (for example leaving the skelp thick in the middle while thinning it at its edges) and preferably also being capable of enlarging, and also possibly reducing the width of the skelp as desired (in order to enable pipe and tubing of different diameters to be made from skelp of a single width). This mill B also incorporates means for, or there are provided a separate means, such, for example, as the edge rolls 27 and 34, capable of re-forming the hot edges of the skelp, trueing up the edges for welding if the edges be irregular in the raw skelp, and also if desired capable of forming a special edge on the skelp as the needs of the pipe being manufactured at the moment may make desirable; a mill at C for folding or forming the skelp into tube shape; a welding mechanism at D, preferably an electric welding mechanism, for welding the seam closed; preferably, at E, a mill for reshaping the pipe as may be desired (for example reducing the diameter of the tubing, or changing a round tube into a tube of square or other special shape); a device or devices for severing the product into pieces of the desired length, special devices for this purpose, peculiarly suited for the type of machine here illustrated, being shown and consisting of two parts marked F1 and F2 in these drawings; and finally at G, preferably, a conveyor to receive severed lengths and carry them through a bath which may be employed simply to cool the tubes or pipes, or for tempering, washing, etc., as the final product desired may require. It will be understood that the skelp is heated, rolled and welded progressively, i. e., each piece beginning at one end and finishing at the other, as the skelp passes through the machine.

In addition, the machine preferably incorporates means or devices for welding the separate pieces of skelp end to end, in order to maintain complete continuity of action throughout the whole machine and to avoid waste of the raw stock, such as otherwise will usually occur at the ends of the skelps. Unless some rather unusual form of heat treatment is required at A, entirely unsuitable for heating the ends of the skelp in the manner required for the welding of the same together, this welding of the ends of the skelp may be accomplished as an incident to the heating of the metal at A and subsequent action of draft rolls or at the mill B. I prefer to lap-weld these ends, and prior to such welding I prefer to reduce the two ends to be joined on rather long bevels as is apparent at the left hand of Fig. 1; I thus provide for a lap welded joint of large area without increasing the thickness of the skelp at the joint to a greater degree than may be reduced to normal at the mill B. The beveling is most conveniently done before the skelps are fed to the machine; it may be done at the steel mills, the skelp being delivered already bevelled in the manner indicated. Also to minimize the attention the operator needs to give the machine, and to minimize failure, I prefer to provide for a substantially automatic feed of each new piece of skelp. The feeder may take various forms. That here illustrated has a pair of swinging arms 1 provided with hinged toothed clutch fingers 2 arranged to grip the pieces of the skelp as the pair of arms 1 oscillates in the direction of the arrow; a pair of cam discs 3 with cam followers on the arms 1, a one-revolution clutch 4 with its operating arm 5, and the control fingers 6 and 7 serve to swing the arms to feed the skelps into the feed rolls 14 and 15. The single revolution clutch 4 may be driven in any suitable way, say by a chain belt connection 8 to the shaft 9 of the driven feed rollers 15. The arrangement is clearly illustrated at the left-hand end of Fig. 1. In operation, after the piece of skelp 10 shown in the process of manufacture into pipe, was well started into the machine, being drawn over the rest rod 11, the operator lifted the next piece of skelp 12 from the stack, and placed it over the rest bar 13, and between the fingers 2 and against the measuring fingers 7 as illustrated. Now when the rear end of the skelp piece 10 passes from underneath the finger 6, this finger 6 will fall and carry down with it the stop finger 7 and at the same time operate the arm 5 to close the clutch 4; the clutch will now turn the cam disc 3 through one complete revolution and then stop it; during this revolution the arms 1 will oscillate once to thrust the forward end of the skelp piece 12 into the bite of the driven feed rolls 14 and 15 and lap it at the bevels, with the preceding sheet 10. On the return stroke of the oscillation the clutch fingers 2 ride freely over the skelp edges, and at the end of the oscillation the arms 1 come to rest again in the position shown. Both skelps 10 and 12 continue on through the machine however in their original lapped relation, under the draft of the various driven rolls incorporated in the machine. Obviously the amount of overlap of sheet 10 or sheet 12 is determined by the longitudinal spacing between the active ends of the fingers 6 and 7. After the sheet or skelp 12 has been taken by the feed rolls 14 and 15, the operator takes away rest bar 11 and raises rest bar 13 into its place, thus placing skelp 12 in the place occupied by sheet 10 in the drawings; rest rod 11 is then placed in the present position of rest rod 13 and the operator now brings forward a third piece of skelp, putting it into the position occupied by the piece 12 of the drawings.

The rolls 14 and 15 are feed rolls, and for this purpose are positively driven, for example by a chain belt 16 running from the shaft of one of the rolls to the drive shaft 18 driven by the electric motor 17, while intermeshed gears between the rolls 14 and 15 drive the second of them from the first. From the feed rolls 14 and 15 the skelp passes first to the electric heating device A before mentioned. Some idler rolls 106 may be used to support the skelp at this part of the machine. Preferably this heating device has the form of two electrode rollers, or two sets of electrode rollers, for example one carried on the shaft 19 and the other on shaft 20; these electrodes can run idly on the skelp and rotate as the skelp is pulled beneath them. A transformer 21 supplies current of suitable amperage to these electrodes, whence it flows through the skelp. I may space the electrodes of different poles from each other entirely in a direction longitudinal of the skelp; in some instances entirely lateral spacing may be sufficient; or as illustrated both lateral and longitudinal spacing may be employed. The metal is heated by the current flowing in the skelp between electrodes of opposite poles, and as will be understood by those skilled in the art, the spacing will be such as to, in co-operation with the amount of current supplied adequately heat the metal. Furthermore I intend to so distribute the current laterally of the skelp, or so localize or concentrate the current paths, as to distribute the heat or localize or concentrate it in whatever manner may best suit the subsequent operations. As illustration of this I have shown the electrodes 42 and 43 as independently slidable on their supporting shafts. It will be apparent that by proper lateral placement of these electrodes the current flow, and hence the heat, can be well distributed over the whole lateral extent of the skelp, or can be mostly concentrated at the center line of the sheet, or at either or both edges, or at intermediate positions, and at any time the path or paths of the current in the metal may be made very short, or longer as desired.

Not only is the metal heated at this point in order to facilitate subsequent working of the metal, but also this heat tends to raise whatever scale there may be on the skelp. A pair of heavy-positively-driven rotating brushes 22 and 23, an electro-magnet 24 to lift any iron pieces, and a spoon-scraper 25 reciprocating back and forth across the skelp also helps to clean the skelp of scale; for example, such as may be present on hot rolled skelp. As here shown the spoon-scraper is reciprocated by a rotating shaft 26 having a double thread of high pitch as will be understood from Fig. 3. The first of the re-forming operations performed on the skelp in the present instance is performed on the two edges of the skelp by the side pressure rolls 27. Preferably these are made sufficiently adjustable to accommodate skelp of varying widths. They need not be positively driven; they may idle on the edges of the skelp. These edge rolls 27, perhaps in co-operation with another pair 34, may be used to straighten out irregular edges on the original rough skelp, or to crowd the edges inwardly if we need thickening at this point, or to re-form the edges of the skelp in any desired manner; for example, they may be used to bevel the edges, or indent them, if and as desired. At the mill B, intended to work on the metal hot (heated at A), the skelp is further re-formed as before indicated, particularly at its faces. This mill is intended to be capable of, at least, reducing the thickness or gauge of the skelp. For this purpose the mill B may be substantially like an ordinary rolling mill for producing plate material of the ferrous metals. Thus its presence on the assembly, in co-operation with the heating agent at A, enables skelp of heavy gauge to be worked up into tubing of a considerably lesser gauge; or to state the matter in another way, its presence here enables the pipe manufacturer to carry in stock skelp of a single gauge or a very few gauges from which he can manufacture tubing of various thinner gauges. A mill at B is not limited to this function alone however; with suitable rolls a mill at this place can be used to reshape the skelp in various ways. For example, the sort of tubing shown in cross-section of Fig. 5 can be made, i. e. tubing with the wall at one side thicker than at the other; to do this the three pairs of rolls 31—32 and 33 can be shaped in such a manner as to roll down flat skelp to the cross-section shown in Fig. 6 where extensive re-forming of the skelp is to be done; however I preferably furnish the mill at B with not less than three pairs of rolls, and I may provide it with one or more augmenting heater as here represented by the small-heater electrodes 28 and 29 and their supplying transformer 30; preferably I dispose at least two pairs of the mill rolls between the heater and the exit end of the mill. With such an arrangement, one step of re-forming can be done by suitably shaped rolls 31, with or without some assisting concentration of the heat in the skelp secured by an appropriate lateral placement of the electrodes at 19 and 20, then the metal reheated at 28—29, and a further step performed by differently shaped or sized rolls at 32, finishing with a finishing pass at 33. Usually I make the electrodes at 28 and 29 laterally adjustable also, individually, so as to be able to take advantage of any heat concentration that may be helpful at 32 or 33 or at later stages.

As before indicated, edge re-forming or edge finishing side rolls may be added to the mill as indicated by the presence of the edge or side rolls 34; like the side rolls 27 these may be idler rolls and mounted for adjustment to a considerable degree crosswise of the skelp, i. e. sufficient to provide the welder with skelp of materially different widths.

On leaving the mill B and side or edge rolls 34, the metal may next pass to the forming mill C, wherein the flat skelp is folded or rolled up into tube form. Various of the forming mills heretofore devised for this purpose may be used at this station C. It is to be noted however that gauge for gauge, and width for width of stock, the forming mill C can be lighter and simpler than is customary with welding machines; this is due to the fact that the metal normally arrives at the forming mill C hot rather than cold as is the usual practice in electric welding. If desired, an electric heater 37 may be placed in front of the rolling mill; this heater may be identical with the heaters 19—20 and 28—29. For illustrative purposes the forming mill is illustrated as composed of a pair of main forming rolls 38, co-operating side rolls 39, a bell 40, and a pair of draft and finishing rolls 41.

On leaving the forming stage C, the metal passes to the welding stage D. Generally speaking, any one of the various known electric welders may be employed at this point, particularly electric resistance tube welders; electric arc welding, or even gas welding may be employed at this point, insofar as the trade will accept pipe or tube welded in these manners. Preferably however, for various reasons I prefer to employ the type of electric resistance welding machine illustrated in the drawings. That is to say, the heat is developed by the resistance of the tube material to the flow of electric current lengthwise of the work and adjacent the seam; electrodes 42 and 43 (they may be roller electrodes) spaced apart lengthwise of the tube, bear on the tube adjacent its seam, and current of sufficiently high amperage is supplied to these electrodes, say by means of the welding transformer 44. From these welding electrodes (however many there may be) the tube passes between a pair of pressure rolls 45 which serve to close the same and complete the weld; they may be assisted by a second pair of rolls 46, placed at right angles to the rolls 45. Rolls 45 and 46 may be idler rolls.

From the welding stage the welded tube passes to driven shaft rolls 47. Beyond these draft rolls, I preferably place a mill E as before mentioned, this being of such a nature as to reduce the diameter of the pipe or tubing if and as desired, and/or re-forming the tube in other ways, either perfecting its intended circular shape or distinctly re-shaping the tube or pipe. Known mechanisms for this purpose may be used at this point. That illustrated consists essentially of two pairs of rolls 49 and 50, which may be finishing rolls, or tend to reduce the pipe diameter, a bell 51 for finishing and reshaping purposes or for reducing the pipe diameter materially, followed by two other pairs of rolls 52 and 53, at least the latter of which are in the nature of finishing rolls. Usually at least some of these rolls, such for example as 52 and 53, will be driven.

If desired, to make the work easier at this point E, or to permit of more substantial reduction in pipe or tube diameter, or greater re-forming of the pipe or tube as it leaves the welding station, the heat contained in the pipe may be further augmented by an electric heater substantially like those heretofore described, excepting that (the work now being in the form of a circular pipe) the electrodes 54 and 55 thereof are provided with concave surfaces to engage the outside of the pipe, and these electrodes may be so arranged as sufficiently encircle the pipe to produce substantially uniform heating through the pipe circumference. However, as before the heat at this heater may be localized, or concentrated on certain parts of the work, if the operations to be performed at the mill E at the moment is better suited by such localization or concentration of the heat. The transformer for supplying the electric current to these electrodes is indicated at 56.

In driving the machine, the various parts must be driven at widely different speeds at times; thus if we simply reduce the gauge of the entering skelp by one-half, no other change being made at the mill B, or at the mill E, it is evident that the peripheral speed of the side rolls 34 and all subsequent rolls and electrodes must be twice the peripheral speed of the feed rolls 14 and 15. At the same time usually the peripheral speeds of the rolls 31, 32 and 33 will need to vary among themselves. For these and analogous reasons, it is necessary, in order to make pipe of various sizes from skelp of a single size, that the speeds of various of the driven rolls be independent of each other, and that they be variable at will independently of each other. The drive of the feed rolls 14 and 15 has already been described; usually these rolls can be driven at constant speed. Usually the peripheral speeds of the roll pairs 31, 32 and 33 must be variable among themselves as before indicated, and also variable with respect to the feed rolls 14 and 15; I prefer to drive each of these roll pairs 31, 32 and 33 by its own electric motor 63, each of which has its own manual (speed) controller 62. Only one of these motors 63 is illustrated, but each of the other two roll pairs has a similar motor driving through its drive shaft 64. The draft rolls 41, 47 and 50, like the feed rolls 14 and 15 may be driven from the electric motor or other prime mover 17 before mentioned, but through a variable speed gearing 65 serving all three; likewise the draft rolls 53 may be driven from 17, through an independent speed reducing gear 66. These speed reducing gears may be Reeves drives. Thereby the peripheral speeds of these various rolls are rendered independent of each other. Usually too the supply circuits of the various heating transformers 21, 44, 56, etc. are provided with separate and independent controllers so that the heat developed at each heater is controllable independently of all the others.

Generally speaking, any device suitable for cutting the pipe or tube into proper lengths at the exit end of the machine may be employed. Preferably however I employ the novel type of severing mechanism here illustrated. In brief this mechanism consists of a device at F1 (Fig. 1) which scores, notches, or otherwise partly severs the metal sheet transversely of itself at the point where the pipe or tubing is to be completely severed; the sheet is not completely severed at this point at this time however, but is only weakened as much as it reasonably can be without endangering accidental severance before the weakened spot passes through the final rolls 53. In co-operation with this scoring or notching mechanism, I use at the exit end of the machine a hammer or trip 67 to strike the pipe or tube just as each notch or score passes through the anvil 68 which substantially completely encircles the pipe or tube; the notch or score is between this anvil and the hammer or trip at 56 at the time of the stroke. The trip or hammer 67 thus shears the pipe or tube at the proper place. This cutting mechanism is so operated that it can be set to cut the pipe or tubing to any desired length within reasonable limits. For this purpose, the scoring tool (knife) 69 is mounted in a drum 73 which is normally stationary; an idler supporting roll 74 for the passing skelp is placed below drum 73. The drum 73 is operated by a single rotation clutch 75 driven by its own electric motor 76. The controller 77 for the single rotation clutch is arranged to be actuated by some one of the rollers bearing on the work, so that a single rotation or a certain number of rotations of this roller bearing on the work brings about operation of the clutch lever 77. The connection of this clutch lever 77 to one of the rollers is through a variable length crank 78 attached or geared to one of the rolls 41, this crank 78, through the link 79, operated a pawl 80 on a ratchet 81 which carries a cam 82 co-operating with the follower lever 83 to actuate the control lever 77 of the clutch. Obviously a certain given number of rotations of the roll 41 will result in a single rotation and operation of the knife 69, and the number of the revolutions of the roll 41 needed to bring this about, and hence the length of the piece of pipe to be cut, depends upon the setting of the variable-length crank. It will be understood that the latter is adjustable at the will of the operator. When in operation the drum 73 rotates at such a speed that the knife 69, while cutting, moves with the skelp at substantially the same speed as the skelp. The mechanism for operating the hammer or trip 67 is substantially like that for operating the scoring knife 69, and also is adjustable so as to cause the trip or hammer to strike the pipe at the proper times. To this end the crank 90 of the trip or hammer may be driven by its own motor 89 (Fig. 4) acting through a one-revolution clutch 91, the control lever 92 of which is connected by a link 93 to a follower 94 actuated by a cam 95 driven by a ratchet wheel 96, the pawl 97 of which is oscillated over the ratchet by a connection to an adjustable-length crank 98 carried by or on the shaft of the said roll 53. It will be apparent that by adjusting the length of this crank, the trip or hammer 67 can be made to strike the pipe passing the anvil 68 at any time; and by suitably adjusting both this crank and the crank at 78, separately, the two can be made to co-operate to sever the pipe into pieces of any desired lengths within the capacities of the adjustable length cranks.

Obviously the conveyor to receive the severed length of pipe or tubing may assume various forms. Preferably I employ a pair of parallel chain belts 100, having fingers 101 between which the lengths of pipe or tube are received, and this conveyor is arranged to carry the severed pieces into a bath 102 before mentioned. Of course the bath may be omitted if desired. On the other hand it may be employed to cool the pipe, temper the metal, etc., etc. as desired.

The various electrodes and rolls may be water-cooled, if desired, in a manner which will be understood. Various pipes for water are indicated at 105.

In addition to serving as a support roll for the knife or scorer 69, the roll 74 can be so formed on its surface as to mark, in any desired way, that face of the hot skelp which forms the outside of the pipe; as shown in Fig. 1, the drum 73 may have an enlarged part to act as a support roll during this operation. Also the mill or rolls at station E, or some of these rolls, can be used solely or in part to mark, and in particular to ornament, the tube, as will be understood.

It will be apparent from this that pipe or tubing of a number of different diameters, a number of different gauges (thickness of wall), and a number of lengths, can be made from skelp of a single gauge, width and length; and the lengths of the finished pipes are independent of the lengths of the pieces of skelp; also that the machine is capable of using cheap metal stock (skelp), even scaly hot rolled stock, and imperfectly finished stock, i. e. stock or skelp neither uniform in gauge nor uniform in width or length. Further, because of the immediate repeated and continuous working of the metal following each heating operation, and the continuity of the operations, the pipe or tubing is emitted from the machine with a surface finished satisfactorily for most purposes without the intermediate operations of pickling or cold rolling. Accordingly the cost of the pipe is in all ways reduced to a minimum and in addition, it will be apparent the machine can be used for the production of products other than pipe or tubing; for example, flat strips of a lesser gauge than the initial skelp, irregular flats, channels, angles, etc. For this it is only necessary, at most, to substitute appropriately formed rolls for various of the rolls shown. Apparatus at any part of the machine not needed for the work in hand at the moment can be taken out of action. The adjustability of the various electrodes before mentioned here plays a part as will be observed, since this adjustability permits the heat to be developed, distributed, or localized, as will best serve in securing any reduction of the metal, bending, etc. that may be desired at the moment.

It will be understood of course that the machine illustrated is subject to many modifications in details of construction, etc., and accordingly my invention is not limited to the precise mechanism or mechanisms illustrated except as appears hereinafter in the claims.

I claim:

1. In a machine for making pipe, spaced electrodes over which the skelp passes, means to supply an electric current to said electrodes whence the current passes through the skelp to heat the same, a rolling mill to receive the hot skelp and reduce its thickness, rolls at right angles to the rolls of said rolling mill to bear on the edges of the hot skelp, a forming mill to receive the heated skelp from said means and shape it into tube form, spaced electrodes over which the shaped skelp passes as it leaves said forming mill, means to supply electric current to said last mentioned electrodes whence the current passes through the skelp to raise the temperature of the edges thereof to a welding temperature, means to sever the completed pipe into lengths, a bath, and a conveyor to receive the severed lengths and convey the same into said bath.

2. In a machine for making pipe, a device near the entrance end of the machine for electrically heating the skelp while the latter is still substantially flat, means receiving the hot skelp from said device and acting to compress the skelp, intermittently operating mechanism to grasp a piece of skelp and feed the same to the machine with the forward end of said skelp in lapped relation to the rear end of the skelp being made into pipe, and means controlled by the skelp being made into pipe to bring said intermittently operating mechanism into action.

3. In a machine for making pipe, spaced electrodes over which the skelp passes, means to supply an electric current to said electrodes whence the current passes through the skelp to heat the same, a rolling mill to receive the hot skelp and reduce its thickness, rolls at right angles to the rolls of said rolling mill to bear on the edges of the hot skelp, a forming mill to receive the heated skelp from said means and shape it into tube form, spaced electrodes over which the shaped skelp passes as it leaves said forming mill, means to supply electric current to said last mentioned electrodes whence the current passes through the skelp to raise the temperature of the edges thereof to a welding temperature, means in advance of said forming mill to partly sever the skelp laterally at regular intervals, and a hammer to strike the completed pipe adjacent each point of such part-severance to complete the severance of the completed pipe into shorter lengths.

4. The combination with subject matter of claim 3, of means to control the operation of said severing means and hammer, said means being adjustable to change the lengths of the severed pieces, and means connecting said controlling means to a roller engaging the work for driving by said roller.

5. In a machine for making pipe, spaced electrodes over which the skelp passes, means to supply an electric current to said electrodes whence the current passes through the skelp to heat the same, a rolling mill to receive the hot skelp and reduce its thickness, rolls at right angles to the rolls of said rolling mill to bear on the edges of the hot skelp, a forming mill to receive the heated skelp therefrom and shape it into tube form, spaced electrodes over which the shaped skelp passes as it leaves said forming mill, means to supply electric current to said last mentioned electrodes whence the current passes through the skelp to raise the temperature of the edges thereof to a welding temperature, means to exert closing pressure on the seam to complete the weld, a mill receiving the pipe after it leaves the seam closing means to reshape the pipe, driving means for said thickness-reducing mill and said reshaping mill, and means to change the speeds of said two mills, each independently of the other.

6. In a machine for making pipe, spaced electrodes over which the skelp passes, means to supply an electric current to said electrodes whence the current passes through the skelp to heat the same, a rolling mill to receive the hot skelp and reduce its thickness, rolls at right angles to the rolls of said rolling mill to bear on the edges of the hot skelp, a forming mill to receive the heated skelp therefrom and shape it into tube form, spaced electrodes over which the shaped skelp passes as it leaves said forming mill, means to supply electric current to said last mentioned electrodes whence the current passes through the skelp to raise the temperature of the edges thereof to a welding temperature, means to exert closing pressure on the seam to complete the weld, draft rolls acting on the work to move the same through the machine, a mill receiving the pipe after it leaves the seam closing means to reshape the pipe, driving means for said thickness-reducing mill, said draft rolls, and said reshaping mill, and means to change the speed of said draft rolls, reshaping mill and thickness-reducing mill, each independently of the others.

7. In a machine for making pipe, spaced electrodes over which the skelp passes, means to supply an electric current to said electrodes whence the current passes through the skelp to heat the same, a rolling mill to receive the hot skelp and reduce its thickness, rolls at right angles to the rolls of said rolling mill to bear on the edges of the hot skelp, a forming mill to receive the heated skelp therefrom and shape it into tube form, spaced electrodes over which the shaped skelp passes as it leaves said forming mill, means to supply electric current to said last mentioned electrodes whence the current passes through the skelp to raise the temperature of the edges thereof to a welding temperature, means to exert closing pressure on the seam to complete the weld, the said thickness-reducing mill having at least two pairs of rolls, an electrode engaging the skelp between two of said pairs of rolls, and means for supplying electric current to the last mentioned electrode whence the current flows through the skelp to augment the heat in the skelp.

8. In a machine for making pipe, spaced electrodes over which the skelp passes, means to supply an electric current to said electrodes whence the current passes through the skelp to heat the same, a rolling mill to receive the hot skelp and reduce its thickness, rolls at right angles to the rolls of said rolling mill to bear on the edges of the hot skelp, a forming mill to receive the heated skelp therefrom and shape it into tube form, spaced electrodes over which the shaped skelp passes as it leaves said forming mill, means to supply electric current to said last mentioned electrodes whence the current passes through the skelp to raise the temperature of the edges thereof to a welding temperature, means to exert closing pressure on the seam to complete the weld, the said thickness-reducing mill having at least three pairs of rolls, spaced electrodes engaging the skelp between two of said pairs of electrodes, some of said electrodes being adjustable in position laterally of the skelp, and means for supplying electric current to the said electrodes whence the current flows through the skelp to augment, locally, the heat in the skelp.

9. In a machine for making pipe, spaced electrodes over which the skelp passes, means to supply an electric current to said electrodes whence the current passes through the skelp to heat the same, a rolling mill to receive the hot skelp and reduce its thickness, rolls at right angles to the rolls of said rolling mill to bear on the edges of the hot skelp, a forming mill to receive the heated skelp therefrom and shape it into tube form, spaced electrodes over which the shaped skelp passes as it leaves said forming mill, means to supply electric current to said last mentioned electrodes whence the current passes through the skelp to raise the temperature of the edges thereof to a welding temperature, means to exert closing pressure on the seam to complete the weld, an electrode engaging the skelp between said thickness-reducing mill and said forming mill, and means for supplying electric current to said electrode for passage through the skelp to augment the heat therein.

10. In a machine for making pipe, spaced electrodes over which the skelp passes, means to supply an eletcric current to said electrodes whence the current passes through the skelp to heat the same, a rolling mill to receive the hot skelp and reduce its thickness, rolls at right angles to the rolls of said rolling mill to bear on the edges of the hot skelp, a forming mill to receive the heated skelp from said means and shape it into tube form, spaced electrodes over which the shaped skelp passes as it leaves said forming mill, means to supply electric current to said last mentioned electrodes whence the current passes through the skelp to raise the temperature of the edges thereof to a welding temperature, means to exert closing pressure on the seam to complete the weld, a mill receiving the pipe after it leaves the last mentioned means to reshape the pipe, an electrode engaging the work between said seam-closing pressure-exerting means and said reshaping mill, and means for supplying current to said electrode for passage through the work to augment the heat therein.

11. In a machine of the kind described, a plurality of electrodes to engage the flat skelp to pass heating current through the latter, including means to heat the ends of separate skelp pieces to a welding temperature, means to work on the skelp so heated, including means to exert welding pressure on the ends of the separate skelp pieces while said ends are still heated to welding temperature by said end-heating means, and mechanism to pass the skelp pieces over said electrodes and the said skelp-working means with the adjacent ends of the successive skelp pieces positioned one on another.

JULIUS L. SUSSMAN.